United States Patent [19]

Knighten et al.

[11] Patent Number: 5,119,855
[45] Date of Patent: Jun. 9, 1992

[54] FACE FRAME COMPONENT MACHINING SYSTEM

[75] Inventors: Charles A. Knighten, Chico; Bruce D. Norlie, Durham, both of Calif.

[73] Assignee: Norfield Industries, Chico, Calif.

[21] Appl. No.: 737,967

[22] Filed: Jul. 30, 1991

[51] Int. Cl.⁵ .................... B27C 9/04; B27C 5/00
[52] U.S. Cl. ..................... 144/35 R; 144/3 R; 144/92; 144/356; 144/365; 144/367; 408/26; 408/29; 269/25
[58] Field of Search ............... 29/33 R, 560; 144/3 R, 144/3 A, 35 R, 92, 93 R, 356, 357, 365, 367; 269/20, 28; 408/10, 26, 28, 29

[56] References Cited

U.S. PATENT DOCUMENTS

| | | |
|---|---|---|
| 229,234 | 6/1880 | Boerstler . |
| 1,198,797 | 9/1916 | Waterman . |
| 2,535,670 | 12/1950 | Croft, Sr. ................... 144/112 |
| 3,263,723 | 8/1966 | Sheffield et al. . |
| 3,543,818 | 12/1970 | Troutner ..................... 144/3 R |
| 3,695,318 | 10/1972 | Maury ....................... 144/35 R |
| 4,254,895 | 3/1981 | Cheak ........................ 227/50 |
| 4,410,024 | 10/1983 | Folse, Sr. .................... 144/353 |
| 4,485,857 | 12/1984 | Norlie et al. ................. 144/3 R |
| 4,694,871 | 9/1987 | Jenkner ...................... 144/35 R |
| 4,736,511 | 4/1988 | Jenkner ...................... 29/560 |

Primary Examiner—W. Donald Bray
Attorney, Agent, or Firm—Townsend and Townsend

[57] ABSTRACT

An apparatus for cutting and drilling stock wherein the cutting and drilling operations are performed simultaneously at a single station. A table having a planar surface is used for supporting the stock. A saw is disposed above the surface of the table, and a pair of drills, each having two drill bits, are disposed below the surface of the table. The saw is pivotally coupled to the table so that the saw may be moved toward the planar surface for cutting the stock. As the saw descends toward the table, a clamping mechanism is activated for fixing the stock in place on the table as it is being cut. As the stock is being cut, the drill bits extend through corresponding apertures in the planar surface for drilling the underside of the stock. After the stock is drilled, the drill bits retract and the clamping mechanism releases its grip on the stock.

30 Claims, 6 Drawing Sheets

FACE FRAME COMPONENT MACHINING SYSTEM

BACKGROUND OF THE INVENTION

The present invention is directed generally to cabinet manufacture, and more particularly to a system for simultaneously cutting and drilling a workpiece for forming face frame components for cabinet manufacture.

Many of today's cabinets are manufactured to include a rectangularly shaped face frame structure to which the cabinet doors may be mounted, and the cabinet sidewalls may be attached. Such face frame structures are typically formed from pre-cut sections typically joined together by fastening screws that are received by pre-drilled holes in one section to penetrate an adjoining section.

Heretofore, cabinet face frame construction typically included cutting a length of material (e.g., wood stock) into shorter sections at one work station, carrying the pre-cut sections to a second workstation where holes are drilled proximate terminus of certain of the section for receiving fastening screws that will attach the sections together to form the face frame structure. This construction may also include carrying the sections, before assembly, to yet a third workstation where the holes are provided a countersinking for receiving the head of the attachment screw below a surface of the section, although using stepped drills to produce the holes and the countersink at the same time will obviate the need for this latter work station.

As can be seen, today's cabinet face frame construction can be very labor-intensive, and thereby expensive. Apparatus for combining the various manufacturing steps used to construct a cabinet face frame is needed.

SUMMARY OF THE INVENTION

The present invention is directed to apparatus for cutting and drilling, e.g., a wood stock, in simultaneous operations, performed at a single workstation, to form the sections needed for assembly of a cabinet face frame structure.

In one embodiment of the invention, there is provided a work support, such as a table or bench, having formed thereon a planar surface for supporting the work piece (e.g., a length of wood). A saw is mounted to the table, movable from a first position removed from the work piece, to a second position for cutting the work piece into sections. Also mounted to the table, proximate the saw, are a pair of drills, each movable from a first, retracted position to a second, drilling position whereat fastening screw receiving holes are angularly formed in a surface of the work piece, proximate the ends cut by the saw. Sensor means are provided to sense when the saw is moved from its first position toward the cutting position, activating a clamp mechanism to clamp and hold the work piece in place on the table as it is being cut and drilled. Sensing movement of the saw towards the cutting position initiates movement of the drills into their drilling positions, thereby automatically and substantially simultaneously cutting and drilling the work piece while held in place. Drill sensors sense when the drills have reached their full, extended positions, activating means to return them to their respective first or retracted positions, at which time the clamping mechanism releases its grip on the work piece.

A number of advantages can now be seen as being obtained by the present invention. First and foremost, the labor heretofore necessary has been significantly reduced by performing two or three operations in one through the automatic and simultaneous clamping, sawing, and drilling provided by the present invention.

Yet another advantage has been discovered. Clamping and holding the workpiece during the sawing operation, as opposed to manually holding the workpiece, produces a cleaner, high quality cut.

These and other advantages and aspects of the present invention will become apparent to those skilled in the art upon a reading of the following detailed description of the invention, which should be taken in conjunction with the accompanying drawings.

DETAILED DESCRIPTION OF THE INVENTION

Figure 1A:
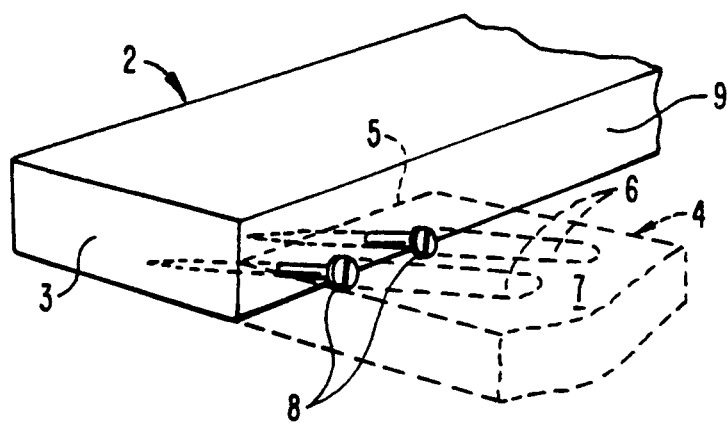
FIG. 1A is a perspective view of a corner of a typical face frame structure, illustrating joining two sections of the face frame by fastening screws.

Referring to the figures, and first FIG. 1A, there is illustrated a joint construction used in much of the cabinet face frame construction today. As shown, one frame section 2 of the face frame has attached, at right angles thereto, a second frame section 4 (illustrated in phantom), adjoining the terminus 3 of the frame section 2. Proximate the terminus 5 of the frame section 4 are a pair of holes 6 formed in a planar surface 7 of the edge section 4, angled toward the terminus 5. The holes 6 are formed to receive fastening screws 8 which penetrate through the plane formed by the terminus 5 and into the edge surface 9 of the frame section 2, fastening the frame section 4 thereto. It is the purpose of the present invention to cut the frame section 4 to length, forming the terminus 5, and at the same time forming the drill holes 6. If desired, the drilling operation used to form the holes 6 may used drill bits with a step configuration so that the openings of the holes 6 are wider at their points of egress to countersink the heads of the fastening screws 8.

Figure 1C:
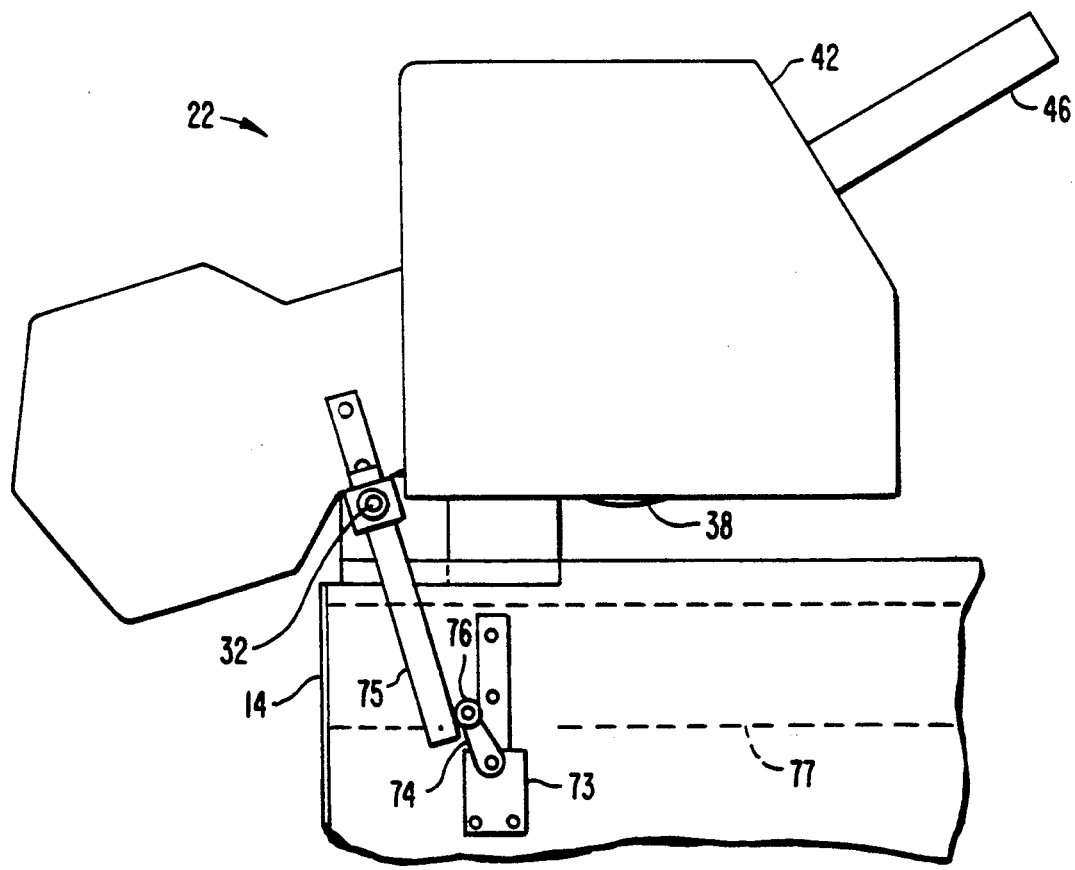
FIG. 1C is a side view of the invention shown in FIG. 1B.
Figure 1B:
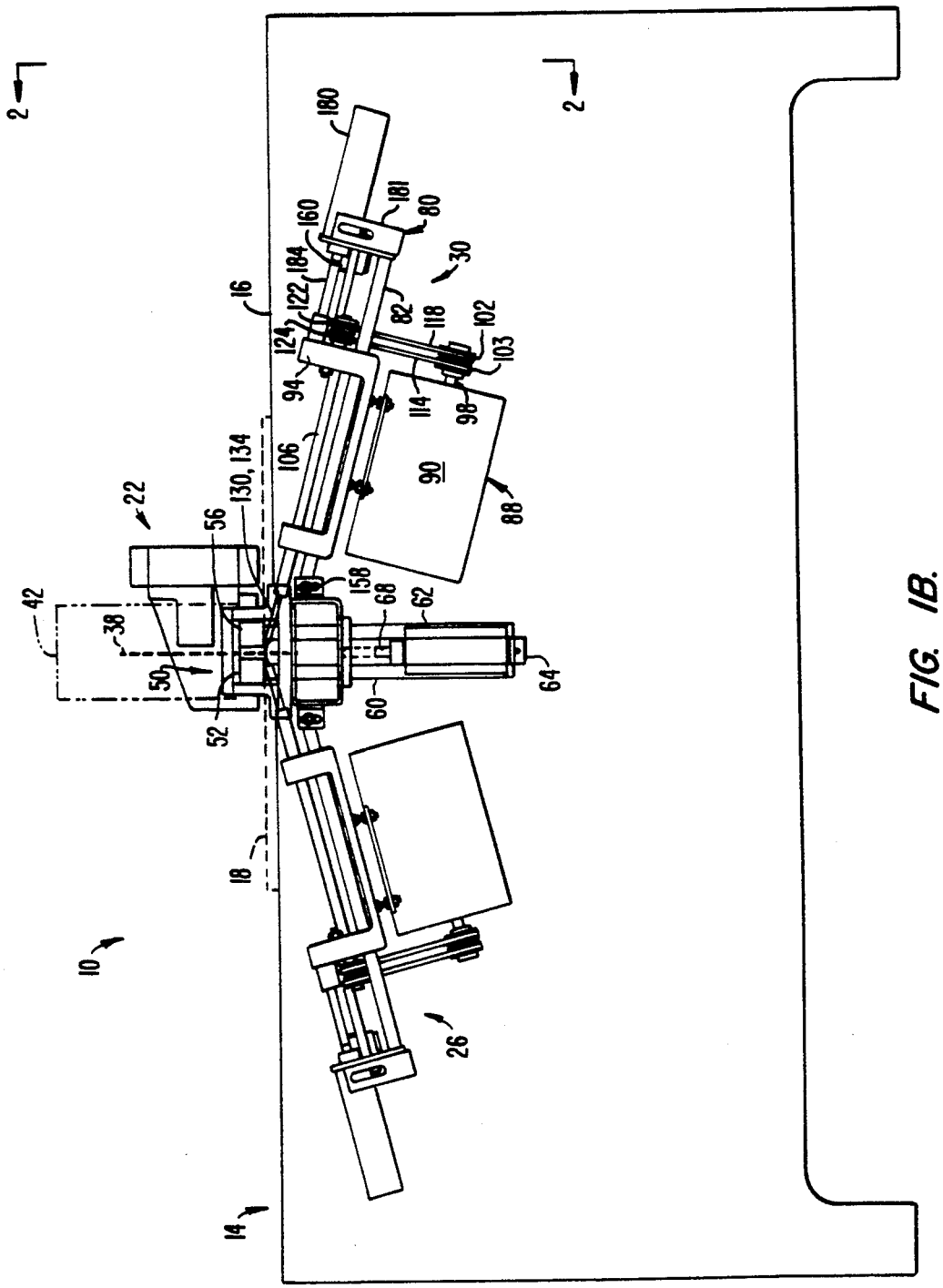
FIG. 1B is a front view of a particular embodiment of the present invention for clamping, cutting and drilling a work piece in one simultaneous operation according to the present invention.

Turning now to FIG. 1B, there is illustrated a workstation, designated generally with the reference numeral 10, for performing the simultaneous cutting and drilling operations in accordance with the present invention. As FIG. 1B shows, the workstation 10 includes support means in the form of a table or bench 14, to provide a generally planar work surface 16 upon which a work piece 18 can be moved and supported during cutting and drilling operations. A saw mechanism 22 is pivotally mounted to the table 14, and positioned above the surface 16, for cutting the work piece 18 into face frame sections (e.g., face frame sections 4, FIG. 1A), and two drill units 26 and 30 are located below the surface 16 for drilling the drill holes 6 (FIG. 1A) simultaneous with the cutting operation.

Figure 3:
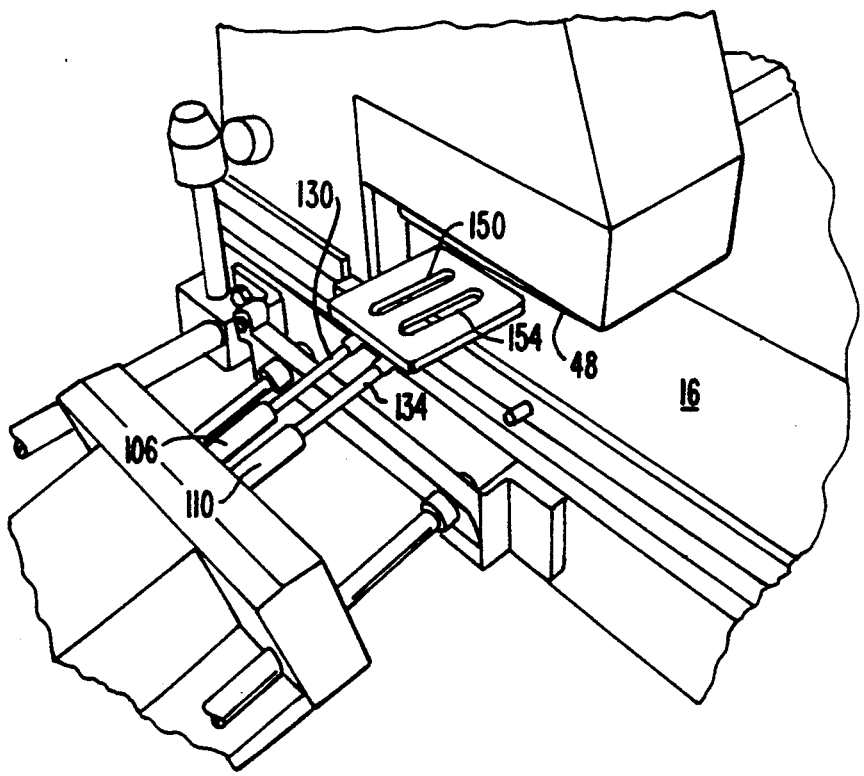
FIG. 3 is a more detailed view of the cutting and drilling apparatus showing how the drill bits are placed relative to the saw.
Figure 2:
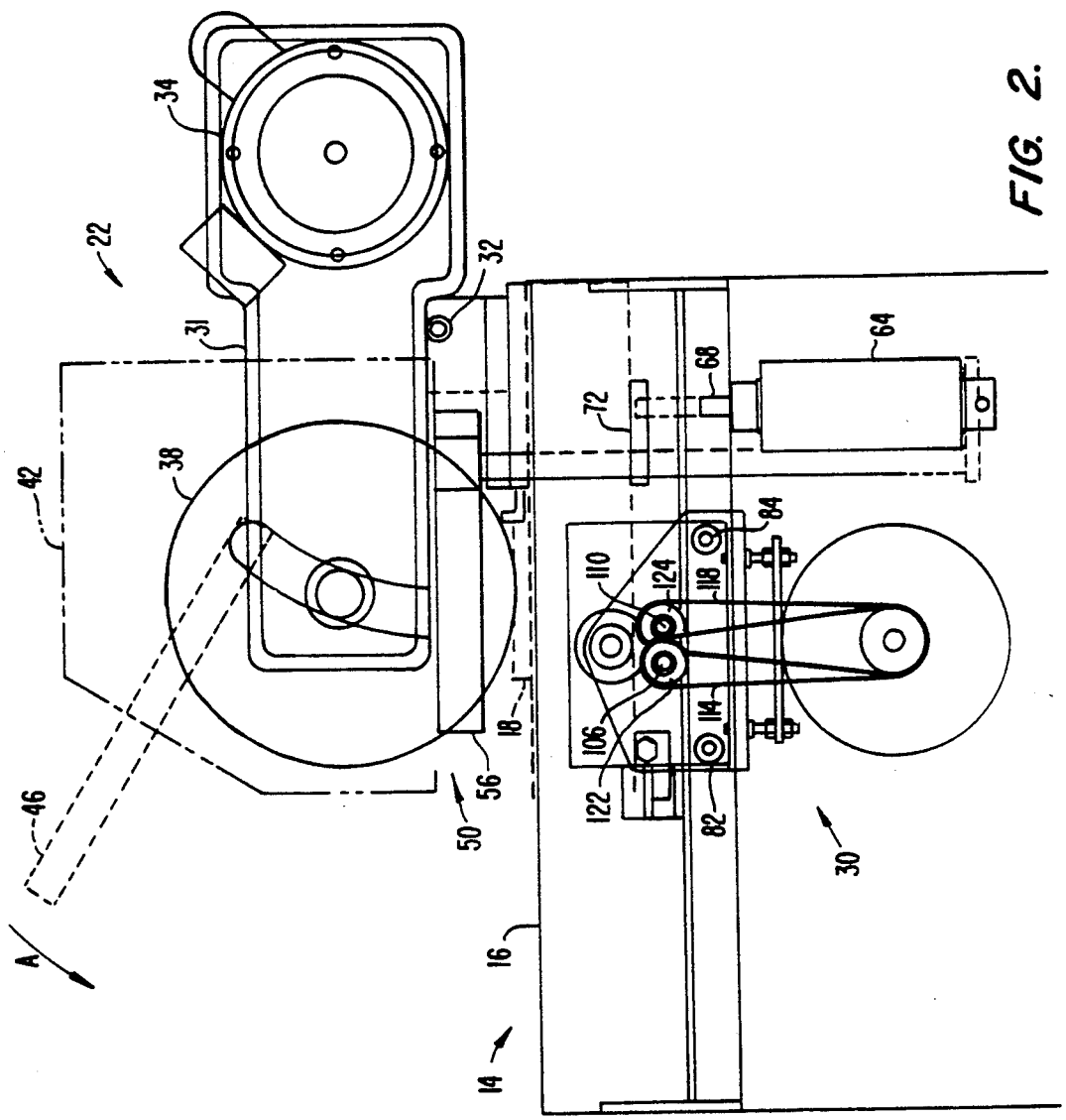
FIG. 2 is a view taken along the line 2—2 of FIG. 1, illustrating features of the apparatus of FIG. 1 as seen from the side.

As can be seen more clearly in FIG. 2, the saw mechanism 22 includes a housing 31 that pivotally attaches the saw mechanism 22 to the bench 14 at a coupling 32. An electric motor 34, mounted within the housing 31, rotatably drives a saw blade 38 for cutting the work piece 18 when the saw mechanism is brought into cutting engagement therewith. The saw blade 38 is situated within a fixed, safety housing 42 to prevent injury to an operator. A handle 46, affixed to the saw 22, provides the means for pivoting the saw 22 about its pivot point at coupling 32 from a first, or home, position into a second, cutting position with the work piece 18. A slot 48 (FIG. 3) is formed in the planar surface 16 to permit the saw blade 38 to pass cleanly through the work material 18 for a clean cut.

A clamp mechanism 50, comprising a pair of clamping bars 52 and 56 (FIGS. 1 and 2), is provided for capturing and holding the work piece 18 in place as it is being cut by the saw 22, and drilled by the drill mechanisms 26, 30. The clamping bars 52, 56 are located on opposite sides of the slot 48, and oriented generally parallel to each other and to the work surface 16. The clamping bars 52, 56 are coupled, by connecting rods 60 and 62, respectively, to a solenoid-actuated pneumatic cylinder 64. As better illustrated in FIG. 2, the pneumatic cylinder 64 is mounted to the table 14 at 72 via a plunger 68. Actuation of the pneumatic cylinder 64, in a manner that will be discussed below (with respect to FIGS. 4A and 4B) will cause the cylinder to move between a retracted position in which the clamping bars 52, 56 are placed in a release position, and a second clamping position with the clamping bars 52, 56 clamping and holding the work piece 18. Thus, when the pneumatic cylinder 64 is actuated, it will move vertically downward, relative to the table 14, pulling with it the connecting rods 60 and 62, bringing the associated clamping bars 52, 56 into capture relation with the work piece 18, to hold it in place for the drilling/cutting operations.

A saw sensor 73 (FIG. 1C) is provided to detect when the saw 22 is rotatably moved toward the surface 16 and into cutting relation with the work piece. As will be seen, it is the saw sensor 73 that initiates clamping and drilling operations as the saw 22 moves downward to cut the work piece.

As FIG. 1C shows, the sensor 73 is in the form of a limit switch having a sensor arm 74 that engages a saw arm 75 by a roller bearing 76. The sensor 73 if fixed by mounted to a brace 77 of the table 14, positioned so that the roller bearing 76 can ride against the saw arm 75 as the saw 22 is pivoted about it coupling 32. Similarly, the saw arm 75 is affixed to the saw 22 to permit it to operate the sensor 73 by releasing the sensor arm 74 when the saw 22 is moved away from its home position toward the surface 16 of table 14. Thereby, such movement of the saw 22 is detected by the sensor 73.

As noted previously, drill units 26 and 30 operate to drill the holes 6 (FIG. 1A) in the work piece 18, proximate the cut made by the saw 22, from the underside of the work piece. Both drill units are constructed and operate in substantially the same manner, so that only the details of construction of drill unit 30 will be discussed. It will be understood, however, that such discussion of the drill unit 30 will apply equally to the drill unit 26, unless otherwise noted.

Referring to FIGS. 1 and 2, the drill unit 30 is shown as including a carriage 80, having guide rails 82 and 84 that mount the carriage 80 to the table 14 and slidably carry a drill mechanism 88. As FIG. 1B illustrates, the carriage 80 is angularly disposed beneath the surface 16 for drilling the work piece 18 at an angle, preferably 15° (plus or minus 5°) relative to horizontal. The angle of carriage 80 may be adjusted by adjustable coupling 158.

The drill mechanism 88 comprises an electric motor 90 that is mounted to a drill carriage 94, configured to travel along the guide rails 82 and 84. .The drill motor 90 includes a drive shaft 98 upon which is coaxially mounted pulleys 102 and 103. Of course, pulleys 102 and 103 could be a single double-belt pulley if desired. The rotation of drive shaft 98 is communicated to drill chucks 106, 110 via drive belts 114, 118 and pulleys 122, 124, respectively. To save space, yet provide sufficient traction, pulleys 122 and 124 overlap in the axial direction of chucks 106 and 110. Drill chucks 106 and 110 are coupled to corresponding drill bits 130, 134 (FIGS. 1B and 3) which selectively extend through openings 150, 154 in the surface 16 when brought into drilling engagement of the work piece 18.

A pneumatic cylinder 180 is mounted to the carriage 80 for effecting movement of the drill mechanism 88 along the guide bars 82 and 84. The pneumatic drill cylinder 180 is attached, as are guide bars 82 and 84, to a back-plate 181. The pneumatic cylinder 180 includes a plunger 184 that is attached to the drill carriage 94 and, through the action of the plunger 184, moves the drill carriage 94, and with it the drill mechanism 88, between two positions: a first, retracted position that places the drill bits 130 and 134 in a non-drilling position relative to the work piece 18; and, when the pneumatic cylinder 180 is actuated, a second position that places the drill bits 130 and 134 in their extended, drilling positions (wherein they extend through the apertures 150 and 154 of surface 16—FIG. 3) for drilling the work piece 18—as the saw 22 moves downwardly into cutting relation with the work piece.

A drill sensor set 160, consisting of a pair of back-to-back mounted sensors, return and drill back sensors 160A and 160B (see FIG. 1D), is mounted to the table 14 to detect when the drill carriage 94, and hence the drill bits 130 and 134, is in the first, retracted position, or has reached the second, fully extended, position. The return sensor 160A detects the retracted position of the drill carriage 94; the drill back sensor 160B detects the extended position. Detection of the carriage 94 in its extended position (i.e., the holes have been drilled in the work piece 18) causes the pneumatic cylinder 180 to be reversed to move the drill carriage 94 back to its first, retracted position.

Figure 1D:
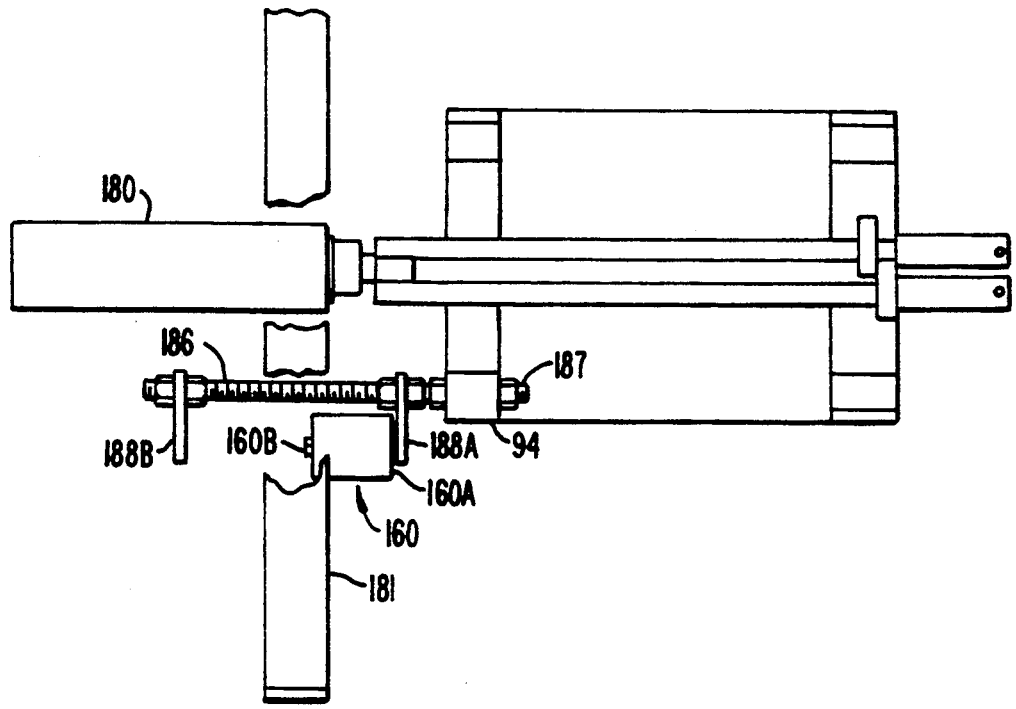
FIG. 1D is a top view of one of the drill mechanisms, in a retracted position, illustrating the sensor mechanism to determine when the drill mechanism is in either its fully extended position or its retracted position.

As better illustrated in FIG. 1D, the return sensor 160A and drill back 160B are mounted back-to-back, and to the back-plate 181. The sensing mechanism includes a threaded bolt 186, one end 187 of which is connected to the drill carriage 94. The back-plate 181 is aperatured to allow the threaded bolt 186 to extend and move freely therethrough as the drill carriage 94 moves.

The threaded bolt 186 carries ears or tabs 188A and 188B that are positioned and configured, to respectively contact the return and the drill back sensors 160A and 160B, depending upon the position of the drill carriage 94. Thus, for example, the tab 188A is positioned on the threaded rod 186 to engage the drill back sensor 160A, detecting that the drill carriage 94 is in its retracted position. When so detected, the pneumatic cylinder 64 is reversed to release the work piece 18 from the grip of the clamping bars 52, 56. Thus, movement of the saw 22 toward cutting the work piece 18 initiates the clamping and drilling operations, but travel sensors 160 and 161 thereafter automatically control the operation of the drills 26, 30 and clamping member 50.

Figure 4A:
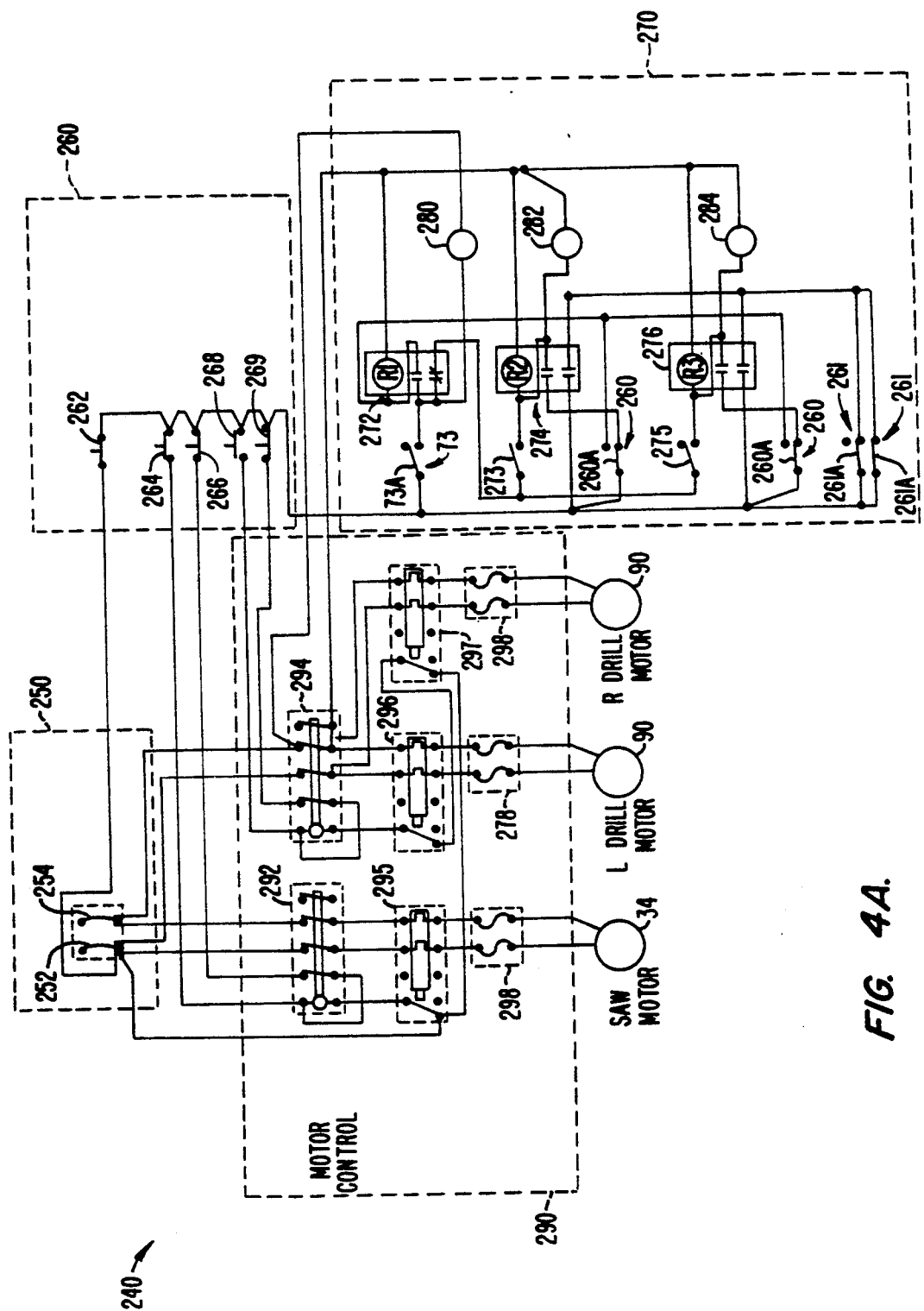
FIGS. 4A and 4B are schematic representations of the electrical and pneumatic system, respectively, used to operate the saw and drill mechanisms shown in FIG. 1, together with the sensor devices used to implement the logical operations for simultaneous clamping, sawing and drilling.
Figure 4B:
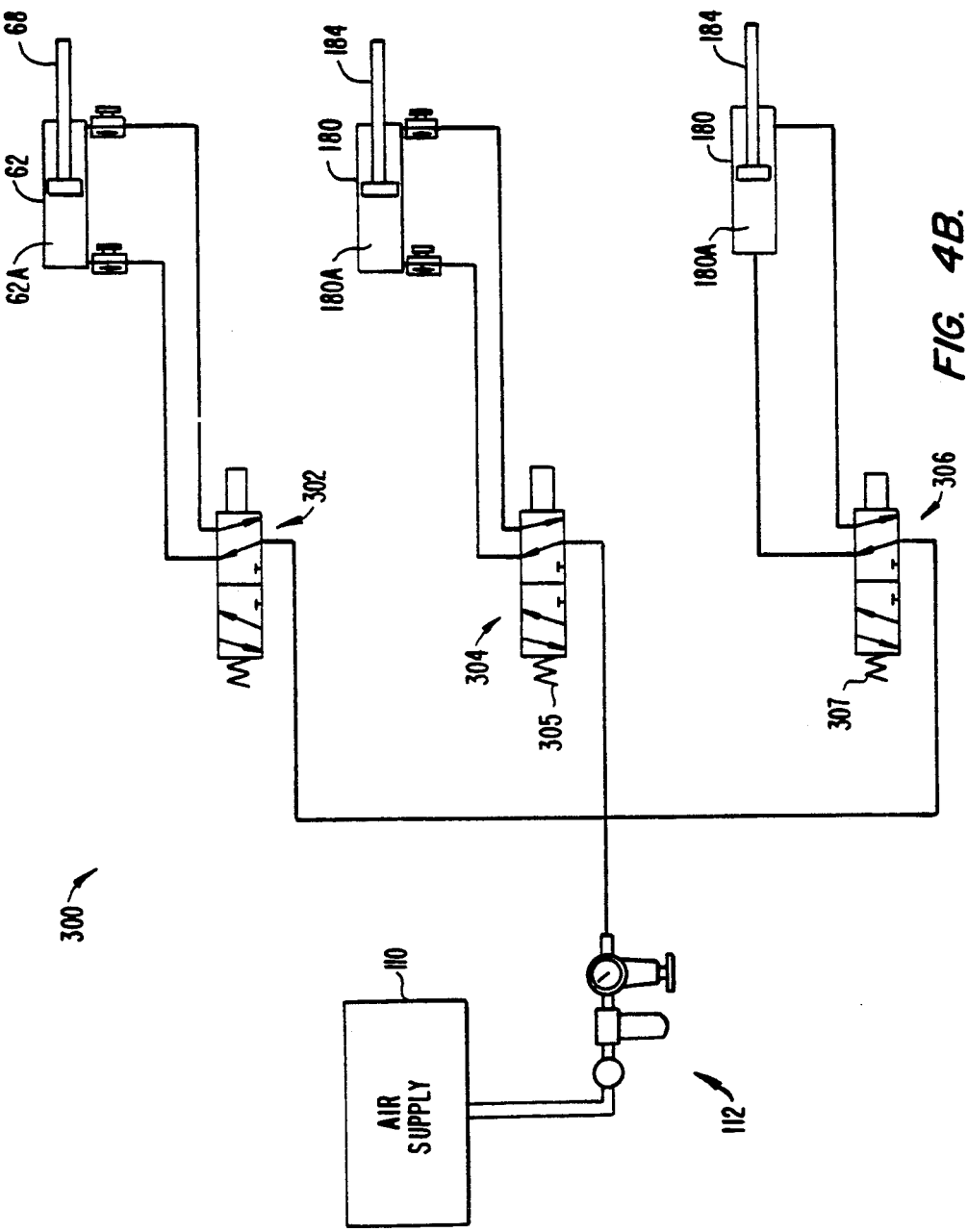

Turning now to FIGS. 4A and 4B, there is shown the electrical and pneumatic controls for operating the saw and drill motors, and the pneumatic cylinder operation that control movement of the drills and the clamping bars. Referring first to FIG. 4A, the electrical controls are shown as including four major sections: the circuit breaker section 250, including circuit breakers 252 and 254; ON/OFF control section 260, comprising a number of finger-depressible push-button switches 262, 264, 266, 268, and 269; a sensor section 270, including relays 272, 274, 276 and solenoid 280, 282, and 284, together with a number of sensors that will be described hereinafter; and a motor control section 290 that includes magnetic starter elements 292, 294, thermal overload relays 295-297, and finally fuses 298.

In addition to providing power to the saw motor 34 and left and right drill motors 90, 90, the sensor section 270 of the control module 240 operates through the solenoids 280-284, to control pneumatic valves 302, 304, and 306 (FIG. 4B) of the pneumatic actuation system 300. The pneumatic valves 302, . . . 306 respectively control air pressure applied to pneumatic clamping cylinders 62, and pneumatic drill cylinders 180, 180, for respectively clamping the work piece 18 and moving the drill bits 130, 134 into drilling relation with the work piece 18.

An air supply 310 provides a source of pneumatic pressure, preferably in the range of 50 psi–130 psi through a regulator 112 to the pneumatic valves 302-306. In the preferred embodiment of the invention, the regulator 112 sets the pressure applied to the pneumatic valves 302-206 in the range of 90–100 psi.

Returning for the moment to FIG. 4A, a 220 VAC supply of power (not shown) is applied through the circuit breakers 252, 254 to the motor control system 290, and communicated to the magnetic starters (i.e., power relays) 292 and 294.

Operation of the work station 10 is initiated by first applying electrical power to the saw motor 34' and the two drill motors 90', 90'. This is done by momentarily depressing the normally open saw and drill start buttons 264 and 268, respectively. This will momentarily close the buttons 264 and 268 to couple the 230 VAC power to the power relays 292, 294, activating them and placing them in a latched condition. The power relays 292, 294, in turn, communicate electrical power to the saw and drill motors 34, 90, 90 via the thermal relays 295, 296 and the fuses 298. The thermal relays 295, 296 operate to detect overcurrent conditions in the motors 34, 90, 90 exhibited in a thermal increase that is sensed by the thermal relays 295, 296. If such overcurrent condition is detected, the thermal switches will unlatch the power relays 292, 294, terminating electric current to the motors 34, 90, 90 to shut them down.

During operation of the workstation 10, the saw motor 34 and drill motors 90, 90 continuously operate. In the event it is desired to stop all three motors 34, 90, 90 together, the normally-closed finger-depressible switch 262, which operates as an emergency stop, is depressed. Switch 262 remains in the open position, removing electrical power from the power relays 292, 294 causing them to unlatch and terminate power to the motors 34, 90, 90. Alternatively, the normally-closed saw stop switch 296 and/or the normally-closed drill motors stop switch 262 may be momentarily depressed to unlatch the power relay 292 and remove power from for the saw motor 34, or unlatch the power relay 294 and remove power from the drill motors 90, 90.

With the saw and drill motors 34, 90, 90 running, a work piece 18 may be moved along the surface 16 and positioned as desired, relative to the slot 48, for cutting and drilling. The operator then, grasping the saw handle 46, pivots the saw 22, and rotating saw blade 38, downwardly toward the work piece 18. Movement of the saw 22 from its "home position" is sensed by the sense switch 73, which forms a part of the sensor block 270 (FIG. 4A), causing switch contact 73A to close. Closing sense switch contact 73A, applies power to the relay 272 which, in turn, actuates the clamp solenoid 280. Clamp solenoid 280, in turn, will cause the pneumatic valve 302 to move into the position shown in FIG. 4B to communicate the air supply 110 to chamber 62A of the pneumatic cylinder 62. Pressurizing the chamber 62A causes extension of the piston 63, and with it movement of the plunger 68 (FIGS. 1A and 2), to clamp and hold the work piece 18 in place.

Closure of the saw sensor switch contact 73A will also apply power to the relay mechanisms 272 and 276 via the (closed) ON/OFF switches 273, 275, in turn causing actuation of the drill solenoids 282, 284. Drill solenoids 282, 284 move the pneumatic valves 304, 306 into the positions shown in FIG. 4B, communicating the air supply 110 to the chambers 180A, 180A of the pneumatic cylinders 180. So pressured, the pneumatic cylinders 180 will extend the plungers 184, 184 to move drill mechanisms 106, into drilling relation with the work piece. When the drill bits 130, 134 have reached their predetermined, fully extended positions, the drill carriage 94 will engage return sensor switch 261 which moves the respective sensor switch arms 261A into a position that 277 terminates actuation of the drill solenoids 282, 284 yet keeps the relay 272 in its latched condition. This, in turn, releases the pneumatic valve mechanisms 304, 306 which are returned by bias springs 305, 307 to a first position to reverse communication of the air supply 110 to the pneumatic valves 180, to retract the plungers 184, 184, returning with the drill mechanisms 106, 106 (FIG. 1B) to a retracted position.

When the piece has been cut, the operator moves the saw handle 46 in a direction that returns the saw 22 to its home position which will open the saw sense switch 73 and switch contact 73A. However, although switch contact 73A provides one path for electrical power to the solenoid 280, switch arms 261A of drill back sensors 261. Thus, power continues to be applied to the relay mechanism 272 to maintain actuation of the clamp cylinder 280 until the drills are retracted, opening contacts 261A of drill back sensors 261, removing power from the clamp solenoid 280. Thereby, the pneumatic valve 302 is reversed, causing the retraction of the plunger 68 by the pneumatic cylinder 62 and release of the work piece 18 from its clamped condition.

While the above is a complete description of the preferred embodiment of the inventions, it will be obvious to those skilled in the art that various modifications and alterations can be employed. For example, more or less drill bits may be provided in different patterns. Multiple saws may be used to simultaneously cut the stock to a desired shape. Consequently, the scope of the invention should not be limited except as described in the claims.

What is claimed is:

1. An apparatus for cutting and drilling stock comprising:
    a stock support having a planar surface for receiving the stock thereon;
    a saw having a saw blade disposed on a first side of the planar surface;
    saw moving means for moving the saw blade toward the planar surface for cutting the stock;
    a drill disposed on a second side of the planar surface, the drill having a drill bit directed toward the planar surface; and
    drill extending means, coupled to the drill bit, for extending the drill bit through an aperture in the planar surface and into the stock when the saw blade is moved toward the planar surface.

2. The apparatus according to claim 1 further comprising:
    travel sensing means for detecting when the drill bit is in an extended position; and
    drill retraction means, coupled to the travel sensing means and to the drill, for retracting the drill bit from the aperture when the travel sensing means detects the drill bit in the extended position.

3. The apparatus according to claim 1 wherein the saw moving means includes means for pivotally coupling the saw to the stock support.

4. The apparatus according to claim 1 wherein the stock support has an opening for receiving the saw blade therethrough when the stock is being cut, and wherein the aperture through which the drill bit is extended is disposed in close proximity to the opening.

5. The apparatus according to claim 1 wherein the drill bit is directed at an angle toward the planar surface.

6. The apparatus according to claim 5 wherein the drill is slidably mounted on a carriage, and further comprising:
    pneumatic means, coupled to the drill, for moving the drill along the carriage between a retracted position and an extended position wherein the drill bit is extended through the aperture in the planar surface; and
    drill control means, coupled to the pneumatic means and responsive to movement of the saw blade, for causing the pneumatic to move the drill to the extended position when the saw blade is moved toward the planar surface.

7. The apparatus according to claim 6 further comprising:
    travel sensing means for detecting when the drill is in an extended position; and
    wherein the drill control means is coupled to the travel sensing means for moving the drill to the retracted position when the travel sensing means detects the drill in the extended position.

8. The apparatus according to claim 7 further comprising angle adjusting means, coupled to the drill bit, for adjusting the angle of the drill bit relative to the planar surface.

9. The apparatus according to claim 1 further comprises stock retaining means for retaining the stock in place on the planar surface as the stock is being cut.

10. The apparatus according to claim 9 wherein the stock retaining means comprises:
    a clamping member;
    a pneumatic clamping means, coupled to the clamping member, for moving the clamping member between a clamping position and an open position; and
    clamping control means, coupled to the pneumatic clamping and responsive to movement of the saw, for causing the pneumatic clamping to move the clamping member to the clamping position when the saw is moved toward the planar surface.

11. The apparatus according to claim 10 further comprising:
    travel sensing means for detecting when the drill bit is in an extended position; and
    drill retraction means, coupled to the travel sensing means and to the drill, for retracting the drill bit from the aperture when the travel sensing means detects the drill bit in the extended position.

12. The apparatus according to claim 11 wherein the travel sensing means detects when the drill bit is in a retracted position, and wherein the clamping solenoid control means is coupled to the travel sensing means for moving the clamping member to the open position when the travel sensing means detects the drill bit in the retracted position.

13. The apparatus according to claim 12 wherein the clamping member is disposed in close proximity to the opening through which the saw blade passes.

14. The apparatus according to claim 13 wherein the clamping member comprises:
    a first clamping bar disposed on a first side of the opening; and
    a second clamping bar disposed on a second side of the opening and being oriented generally parallel with the first clamping bar.

15. An apparatus for cutting and drilling stock comprising:
    a stock support having a planar surface for receiving the stock thereon;
    a saw pivotally coupled to the stock support, the saw having a saw blade disposed on a first side of the planar surface;
    wherein the stock support has an opening for receiving the saw blade therethrough when the stock is being cut;
    a carriage coupled to the stock support on a second side of the planar surface;
    a drill slidably disposed on the carriage, the drill having a drill bit directed toward the planar surface at a selected angle;
    a drill pneumatic means, coupled to the drill, for moving the drill along the carriage between a retracted position and an extended position wherein the drill bit is extended through an aperture in the planar surface that is located in close proximity to the opening through which the saw blade passes; and
    drill control means, coupled to the drill pneumatic means and responsive to movement of the saw blade, for causing the drill pneumatic means to move the drill to the extended position when the saw blade is moved toward the planar surface.

16. The apparatus according to claim 15 further comprising:
   travel sensing means for detecting when the drill is in the extended position; and
   wherein the drill control means is coupled to the travel sensing means for moving the drill to the retracted position when the travel sensing means detects the drill in the extended position.

17. The apparatus according to claim 16 further comprising:
   a clamping member for retaining the stock in place on the planar surface as the stock is being cut;
   a clamp pneumatic means, coupled to the clamping member, for moving the clamping member between a clamping position and an open position; and
   clamping control means, coupled to the solenoid and responsive to movement of the saw, for causing the clamp pneumatic means to move the clamping member to the clamping position when the saw is moved toward the planar surface.

18. The apparatus according to claim 17 wherein the travel sensing means detects when the drill bit is in a retracted position, and wherein the clamping control means is coupled to the travel sensing means for moving the clamping member to the open position when the travel sensing means detects the drill bit in the retracted position.

19. The apparatus according to claim 18 wherein the clamping member is disposed in close proximity to the opening through which the saw blade passes.

20. The apparatus according to claim 19 wherein the clamping member comprises:
   a first clamping bar disposed on a first side of the opening; and
   a second clamping bar disposed on a second side of the opening and being oriented generally parallel with the first clamping bar.

21. The apparatus according to claim 20 further comprising angle adjusting means, coupled to the drill bit, for adjusting the angle of the drill bit relative to the planar surface.

22. An apparatus for cutting and drilling stock comprising:
   a stock support having a planar surface for receiving the stock thereon;
   a saw pivotally coupled to the stock support, the saw having a saw blade disposed on a first side of the planar surface;
   wherein the stock support has an opening for receiving the saw blade therethrough when the stock is being cut;
   a first carriage coupled to the stock support on a second side of the planar surface and on a first side of the opening;
   a first drill slidably disposed on the carriage, the first drill having a first drill bit directed toward a portion of the planar surface on the first side of the opening at a selected angle;
   a first drill pneumatic means, coupled to the first drill, for moving the first drill along the carriage between a retracted position and an extended position wherein the first drill bit is extended through an aperture in the planar surface in close proximity to the opening through which the saw blade passes;
   first drill control means, coupled to the first drill pneumatic and responsive to movement of the saw blade, for causing the first drill pneumatic to move the first drill to the extended position when the saw blade is moved toward the planar surface;
   a second carriage coupled to the stock support on a second side of the planar surface and on a second side of the opening;
   a second drill slidably disposed on the carriage, the second drill having a second drill bit directed toward a portion of the planar surface on the second side of the opening at a selected angle;
   a second drill pneumatic means, coupled to the second drill, for moving the second drill along the carriage between a retracted position and an extended position wherein the second drill bit is extended through an aperture in the planar surface in close proximity to the opening through which the saw blade passes;
   second drill control means, coupled to the second drill pneumatic and responsive to movement of the saw blade, for causing the second drill solenoid to move the second drill to the extended position when the saw blade is moved toward the planar surface.

23. The apparatus according to claim 22 further comprising:
   travel sensing means for detecting when the first and second drills are in extended positions; and
   wherein the first drill control means and the second drill control means are coupled to the travel sensing means for moving the first and second drills to their retracted positions when the travel sensing means detects the first and second drills in the extended position.

24. The apparatus according to claim 23 further comprising:
   a clamping member for retaining the stock in place on the planar surface as the stock is being cut;
   a clamping pneumatic means, coupled to the clamping member, for moving the clamping member between a clamping position and an open position; and
   clamp control means, coupled to the pneumatic clamp means and responsive to movement of the saw, for causing the pneumatic clamp means to move the clamping member to the clamping position when the saw is moved toward the planar surface.

25. The apparatus according to claim 24 wherein the travel sensing means detects when the first and second drills are in retracted positions, and wherein the clamping control means is coupled to the travel sensing means for moving the clamping member to the open position when the travel sensing means detects the first and second drills in the retracted position.

26. The apparatus according to claim 25 wherein the clamping member is disposed in close proximity to the opening through which the saw blade passes.

27. The apparatus according to claim 26 wherein the clamping member comprises:
   a first clamping bar disposed on a first side of the opening; and
   a second clamping bar disposed on a second side of the opening and being oriented generally parallel with the first clamping bar.

28. The apparatus according to claim 27 further comprising angle adjusting means, coupled to the first and second drill bits, for adjusting the angle of the first and second drill bits relative to the planar surface.

29. An apparatus for cutting and drilling stock comprising:
- a stock support having a planar surface for receiving the stock thereon;
- a saw having a saw blade disposed on a first side of the planar surface;
- saw moving means for moving the saw blade toward the planar surface for cutting the stock;
- a drill disposed on a second side of the planar surface, the drill comprising:
  - a first drill bit directed toward the planar surface along a first axis;
  - a first drill bit pulley disposed on the first drill bit;
  - a second drill bit directed toward the planar surface along a second axis that is parallel to the first axis;
  - a second drill bit pulley disposed on the second drill bit;
  - wherein the first and second drill bit pulleys overlap in a direction of the first and second axes;
- a motor having a shaft with first and second motor pulleys mounted thereon;
- a first belt passing around the first motor pulley and the first drill bit pulley;
- a second belt passing around the second motor pulley and the second drill bit pulley; and
- drill extending means, coupled to the first and second drill bits, for extending the first and second drill bits through corresponding apertures in the planar surface and into the stock when the saw blade is moved toward the planar surface.

30. An apparatus for cutting stock comprising:
- a stock support having a planar surface for receiving the stock thereon;
- a saw having a saw blade disposed on a first side of the planar surface;
- saw moving means for moving the saw blade toward the planar surface for cutting the stock;
- a clamping member;
- a pneumatic clamping means, coupled to the clamping member, for moving the clamping member between a clamping position and an open position; and
- clamping control means, coupled to the pneumatic clamping and responsive to movement of the saw, for causing the pneumatic clamping to move the clamping member to the clamping position when the saw is moved toward the planar surface.

* * * * *